United States Patent Office 3,470,154
Patented Sept. 30, 1969

3,470,154
DIBENZO[e,g][1,4]OXAZOCINES AND DIBENZO [e,g][1,4]THIAZOCINES
John J. Lafferty, Levittown, Pa., assignor to Smith Kline & French Laboratories, Philadelphia, Pa., a corporation of Pennsylvania
No Drawing. Filed Feb. 21, 1967, Ser. No. 617,464
Int. Cl. C07d 93/44, 87/54; A61k 27/00
U.S. Cl. 260—239.3        6 Claims

ABSTRACT OF THE DISCLOSURE

Dibenzo[e,g][1,4]oxazocines and dibenzo[e,g][1,4]-thiazocines having central nervous system depressant activity are prepared by ring closure of a 2'-amino-2-biphenylyl acid. The benzo[e] ring may be substituted by halogen, lower alkyl, lower alkoxy or trifluoromethyl. The azocine ring may be C-substituted by lower alkyl, phenyl, substituted phenyl or benzyl, have a carbonyl function or additionally be N-substituted by lower alkyl, lower alkenyl, lower alkanoyl, cycloalkylcarbonyl, cycloalkyl-lower alkyl or diloweralkylaminoloweralkyl. The N-substituted derivatives are prepared by alkylation with an appropriate halide or acylation with an appropriate acyl halide.

This invention relates to chemical compounds having a novel ring system, namely dibenzo[e,g][1,4]oxazocines and dibengo[e,g][1,4]thiazocines. The compounds of this invention have useful pharmacodynamic activity and more specifically have central nervous system depressant activity as demonstrated in the standard dose range procedure in mice.

The dibenzoxazocines and dibenzothiazocines of this invention may be represented by the following general structural formula:

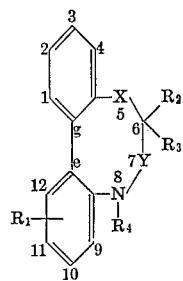

FORMULA 1 in which:
X represents oxygen or sulfur;
Y represents methylene(—CH$_2$—) or carbonyl($>$C=O);
R$_1$ represents hydrogen, halogen such as chlorine or bromine, lower alkyl such as methyl, lower alkoxy such as methoxy, or trifluoromethyl;
R$_2$ represents hydrogen or lower alkyl such as methyl or ethyl;
R$_3$ represents hydrogen, lower alkyl such as methyl or ethyl, phenyl, phenyl substituted by methyl, methoxy or chloro, or benzyl; and R$_4$ represents hydrogen, lower alkyl such as methyl, ethyl or isopropyl, lower alkenyl such as allyl or dimethylallyl, lower alkanoyl such as acetyl or propionyl, cycloalkylcarbonyl such as cyclopropylcarbonyl, cycloalkyl-lower alkyl such as cyclopropylmethyl, cyclobutylmethyl or cyclohexylethyl, or diloweralkylaminoloweralkyl such as dimethylaminopropyl.

Preferred compounds of this invention are represented by the following formula:

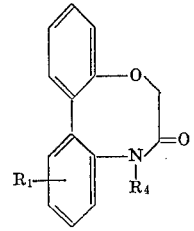

in which R$_1$ represents hydrogen, chlorine or trifluoromethyl and R$_4$ represents hydrogen, methyl, allyl, acetyl, cyclopropylcarbonyl, cyclopropylmethyl or dimethylaminopropyl.

By the terms lower alkyl and lower alkoxy where used herein groups having from 1 to 4 carbon atoms are indicated. The term lower alkanoyl includes aliphatic carboxylic acid moieties of from 2 to 4 carbon atoms. The terms lower alkenyl and cycloalkyl include groups having from 3 to 6 carbon atoms.

The nontoxic pharmaceutically acceptable acid addition salts of the compounds of Formula I are also included within the scope of this invention. Both organic and inorganic acids can be employed to form such salts, illustrative acids being sulfuric, nitric, phosphoric, hydrochloric, citric, acetic, lactic, tartaric, pamoic, ethane-disulfonic, sulfamic, succinic, cyclohexylsulfamic, fumaric, maleic, benzoic and the like. These salts are readily prepared by methods known to the art.

The novel compounds of this invention are prepared by the following process:

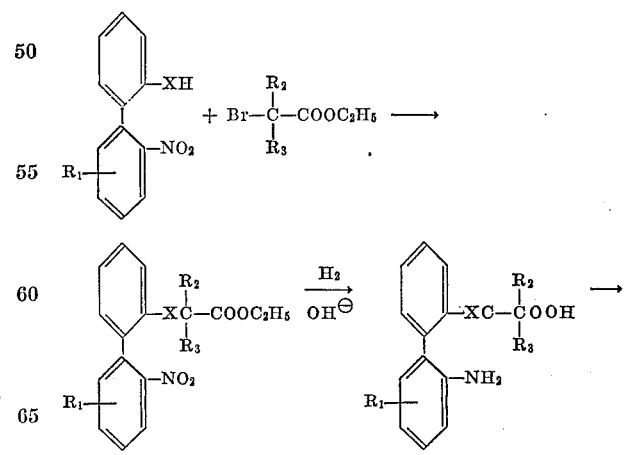

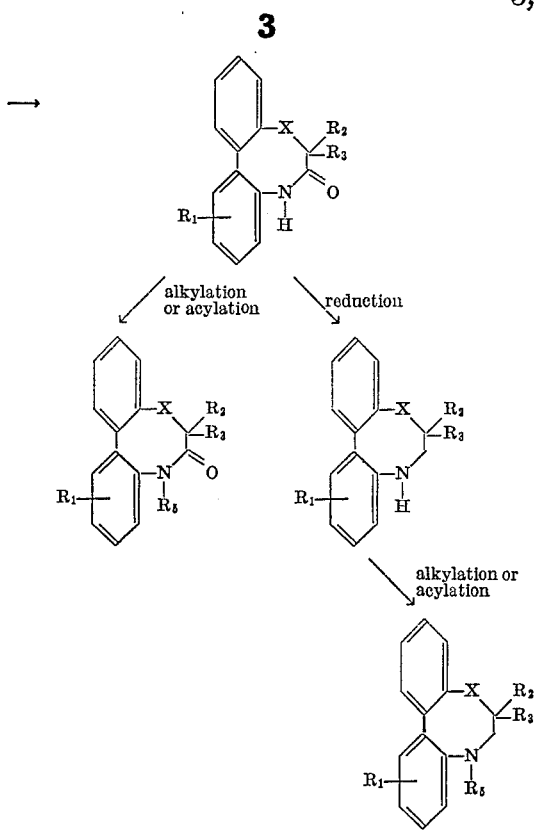

where X, $R_1$, $R_2$ and $R_3$ are as defined above and $R_5$ is lower alkyl, lower alkenyl, lower alkanoyl, cycloalkylcarbonyl, cycloalkyllower alkyl or diloweralkylaminoloweralkyl. As shown in the above synthetic scheme an appropriately substituted 2-nitrobiphenyl is condensed with an ethyl bromoacetate or generally a lower alkyl haloacetate, preferably in the presence of an alkali metal condensing agent such as sodium hydride and in a suitable nonreactive organic solvent such as dimethylsulfoxide. The resulting 2-nitrobiphenyl ester is catalytically reduced preferably with Raney nickel and hydrogen under pressure in an alcoholic solvent and the amino ester is hydrolyzed with an alkali metal hydroxide in an alcoholic solvent preferably methanolic potassium hydroxide to give the 2-aminobiphenylyl acid. Alternatively the 2-nitrobiphenylyl ester may be hydrolyzed first and the 2-nitrobiphenylyl acid reduced under the same conditions. The 2-aminobiphenylyl acid, as the free base or an acid addition salt thereof, is then ring closed by heating alone or preferably in a solvent at a temperature of from 175–250° C., advantageously in nitrobenzene at the reflux temperature, for from 5 to 60 minutes. The resulting 7-keto compound is converted to other products of this invention as shown above by reduction with preferably a bimetallic hydride such as lithium aluminum hydride and/or N-alkylation or -acylation with an appropriate $R_5$-substituted halide such as an iodide, bromide or chloride in the presence of an alkali metal condensing agent, preferably sodium hydride, and in a suitable nonreactive organic solvent such as dimethylsulfoxide. Alternatively an N-alkylated 7-keto compound may be similarly reduced to yield the corresponding N-alkylated reduced product.

The N-alkanoyl or N-cycloalkylcarbonyl derivatives, with or without a 7-keto group, are also useful as intermediates to prepare the corresponding N-lower alkyl or N-cycloalkylmethyl products.

The 2-hydroxy-2'-nitrobiphenyl starting materials used as described above are prepared as their methyl ethers by a procedure reported in Acta. Chim. Scandinavica 20, 423 (1966). Thus a 2-nitrobenzoic acid is heated in boiling quinoline with 2-iodoanisole in the presence of cuprous oxide to yield a 2-methoxy-2'-nitrobiphenyl. The methyl ether is readily cleaved by heating in 48% hydrobromic acid.

The 2-mercapto-2'-nitrobiphenyl starting materials similarly used are prepared from the corresponding 2-hydroxy-2'-nitrobiphenyl compounds by a procedure reported in J. Org. Chem. 31, 3980 (1966). Thus a 2-hydroxy-2'-nitrobiphenyl in dimethylformamide solution is treated with one equivalent of sodium hydride and dimethylthiocarbamoyl chloride to give the O-(2'-nitro-2-biphenylyl)-dimethylthiocarbamate. The latter is rearranged by heating for about 30 minutes at 180–200° C. to yield the S-(2'-nitro-2-biphenylyl)-dimethylthiocarbamate which is hydrolyzed by heating in aqueous methanolic sodium hydroxide solution to the 2-mercapto-2'-nitrobiphenyl.

The novel compounds of this invention may be administered orally or parenterally in conventional dosage unit forms such as tablets, capsules, injectables or the like, by incorporating the appropriate dose of a compound of Formula I with carriers according to accepted pharmaceutical practices.

The foregoing is a general description of how to prepare the compounds of this invention. The following examples illustrate the preparation of specific compounds and should not be construed as limiting the scope of the invention since appropriate variations in the starting materials will produce other corresponding products set forth in Formula I.

EXAMPLE 1

A mixture of 5 g. of 2-methoxy-2'-nitrobiphenyl [Acta. Chimica Scandinavica 20, 423 (1966)], 25 ml. of 48% hydrobromic acid and 25 ml. of acetic anhydride is heated for 26 hours. The reaction mixture is diluted with 250 ml. of water, made strongly alkaline and extracted with benzene. The aqueous layer is made acidic and extracted with ether. The dried extract is evaporated to yield 2-hydroxy-2'-nitrobiphenyl.

To a solution of 6 g. of 2-hydroxy-2'-nitrobiphenyl in 20 ml. of dimethylsulfoxide is added 0.74 g. of sodium hydride under nitrogen at room temperature. The mixture is stirred for 15 minutes, treated with 5.14 g. of ethyl bromoacetate and the temperature raised to 70° C. for one hour. The cooled reaction mixture is treated with 200 ml. of water and extracted with methylene chloride. The dried extract is evaporated to give ethyl 2-(2'-nitro)-biphenoxyacetate, M.P. 76–78° C.

The above prepared ethyl biphenoxyacetate in ethanol solution is hydrogenated in the presence of Raney nickel at 50 p.s.i. on a shaker and the resulting ethyl 2-(2'-amino)-biphenoxyacetate is hydrolyzed with methanolic potassium hydroxide by heating on the steam bath for one hour to give the corresponding acid.

The above prepared 2-(2'-amino)-biphenoxyacetic acid (1 g.) is slurried in 50 ml. of nitrobenzene and the temperature raised to reflux. After 15 minutes the nitrobenzene is removed in vacuo to give 6H-dibenzo[e,g][1,4]-oxazocinone-7(8H), M.P. 180–181° C.

Reduction of the above prepared ketone with lithium aluminum hydride in tetrahydrofuran yields 6H-dibenzo-[e,g][1,4]oxazocine-(7H,8H).

EXAMPLE 2

To a solution of 1.8 g. of 6H-dibenzo[e,g][1,4]-oxazocinone-7(8) (prepared as in Example 1) in 20 ml. of dimethylsulfoxide is added 0.11 g. of sodium hydride under nitrogen. The resulting mixture is stirred for 15 minutes and then treated with 3.3 g. of methyl iodide. After stirring at room temperature for three and one-half hours, 150 ml. of water is added and the mixture is extracted with ether. The dried ether extract is concentrated to give 8 - methyl - 6H - dibenzo[e,g][1,4]oxazocinone-7-(8H), M.P. 118°–119° C.

Similarly reaction with an equivalent amount of allyl bromide yields the corresponding 8-allyl-6H-dibenzo[e,g][1,4]oxazocinone-7(8H).

EXAMPLE 3

A mixture of 3.0 g. of 6H-dibenzo[e,g][1,4]-oxazocinone-7(8H) (prepared as in Example 1) and 0.32 g. of sodium hydride in 30 ml. of dimethylsulfoxide is stirred for 15 minutes at room temperature under nitrogen and then a solution of 4.8 g. of 3-dimethylaminopropyl chloride in 10 ml. of dimethylsulfoxide is added. The mixture is stirred and heated at 80° C. for one hour, cooled, diluted with 150 ml. of water and extracted with chloroform. The extract is water washed and extracted with 10% hydrochloric acid. The acid extract is made alkaline, extracted with ether and the dried ether extract is distilled in vacuo. The oily residue is distilled to give 8-(3-dimethylaminopropyl)-6H-dibenzo-[e,g][1,4]oxazocinone-7(8H), B.P. 165–167° C./0.05 mm.

Similarly alkylation of 6H-dibenzo[e,g][1,4]-oxazocine-(7H,8H) (prepared as in Example 1) as described above yields the corresponding 8-(3-dimethylaminopropyl)-6H-dibenzo[e,g][1,4]oxazocine-(7H,8H).

EXAMPLE 4

A mixture of 12.1 g. of 5-chloro-2-nitrobenzoic acid, 14 g. of 2-iodoanisole, 5.7 g. of cuprous oxide and 25 ml. of quinoline is heated with stirring at 240° C. (oil bath temperature) for one hour and at 260° C. for an additional hour. The cooled reaction mixture is diluted with 300 ml. of ether and filtered. The filtrate is extracted with 20% hydrochloric acid, water washed and extracted with 15% potassium carbonate solution. The ether solution is dried, evaporated and the oily residue distilled to give 2-methoxy-2'-nitro-5'-chlorobiphenyl, B.P. 130–160° C./0.1–0.5 mm.; M.P. 90–91.5° C.

To a mixture of 40 ml. of 48% hydrobromic acid and 40 ml. of acetic anhydride is added 13 g. of 2-methoxy-2'-nitro-5'-chlorobiphenyl. The resulting mixture is heated for 26 hours, cooled, made alkaline and extracted with benzene. The aqueous alkaline solution is made acidic to precipitate 2-hydroxy-2'-nitro - 5' - chlorobiphenyl, M.P. 147–149° C.

A solution of 4 g. of 2-hydroxy-2'-nitro-5'-chlorobiphenyl in 25 ml. of dimethylsulfoxide under nitrogen is treated with 0.39 g. of sodium hydride at room temperature with stirring. After 10 minutes 2.7 g. of ethyl bromoacetate in 5 ml. of dimethylsulfoxide is added and the temperature is raised to 75–80° C. for 45 minutes. The cooled reaction mixture is treated with 100 ml. of water and 50 ml. of ether. The ether solution is washed, dried and evaporated in vacuo to give ethyl 2-(2'-nitro-5'-chloro)-biphenoxyacetate which is heated in methanolic potassium hydroxide solution on the steam bath for one hour to yield 2 - (2' - nitro - 5' - chloro)-biphenoxyacetic, acid, M.P. 123–124° C. The nitro acid is hydrogenated over Raney nickel catalyst and the resulting amino acid is heated to about 190° C. under nitrogen for 25 minutes. The product is chromatographed to give 11-chloro-6H-dibenzo[e,g][1,4]oxazocinone - 7(8H), M.P. 298° C. (dec.).

EXAMPLE 5

To a solution of 5 g. of 2-hydroxy-2'-nitrobiphenyl (prepared as in Example 1) in 25 ml. of dimethylsulfoxide at room temperature is added 0.66 g. of sodium hydride under nitrogen. The mixture is stirred for 15 minutes, 5.4 g. of ethyl α-bromopropionate is added and the temperature is raised to 80° C. for 30 minutes. The cooled reaction mixture is treated with 100 ml. of water and 50 ml. of ether. The ether layer is washed with aqueous potassium carbonate solution, dried and evaporated in vacuo to give ethyl α-(2'-nitro-2-biphenoxy)-propionate, M.P. 79–81° C. The ester is dissolved in 150 ml. of ethanol and hydrogenated over Raney nickel at 80 p.s.i. to give ethyl α-(2'-amino-2-biphenoxy)-propionate which is refluxed for two and one-half hours in a solution of two equivalents of potassium hydroxide, 50 ml. of water and 50 ml. of ethanol. The reaction mixture is concentrated, diluted with water and the resulting solution made acidic with acetic acid. Concentration of the acidic solution yields α-(2'-amino-2-biphenoxy)-propionic acid.

A mixture of α - (2' - amino - 2 - biphenoxy)-propionic acid hydrochloride (prepared from the free base with ethereal hydrogen chloride) in 100 ml. of nitrobenzene is refluxed for 45 minutes. The reaction mixture is extracted with 10% sodium hydroxide solution, water washed, dried and evaporated in vacuo. The solid residue is sublimed at 170° C./0.05 mm. to yield 6-methyl-6H-dibenzo[e,g][1,4]oxazocinone-7(8H), M.P. 199–200° C.

Similarly by employing 5.9 g. of ethyl α-bromoisobutyrate or 7.7 g. of ethyl α-bromo-2-phenylpropionate instead of ethyl α-bromopropionate in the above reaction sequence there is obtained 6,6-dimethyl-6H-dibenzo[e,g][1,4]oxazocinone-7(8H), M.P. 236–237° C. or 6-benzyl-6H-dibenzo[e,g][1,4]oxazocinone-7(8H).

EXAMPLE 6

A mixture of 7.4 g. of 2-hydroxy-2'-nitrobiphenyl (prepared as in Example 1) and 1.6 g. of sodium hydride in 30 ml. of dimethylsulfoxide is stirred under nitrogen at room temperature for 10 minutes and then 8.4 g. of ethyl α-bromophenylacetate is added. The resulting mixture is stirred and heated at 70° C. for 35 minutes, cooled, treated with 100 ml. of water and extracted with ether. The dried ether extract is evaporated to yield ethyl α-(2'-nitro-2-biphenoxy)-phenylacetate, M.P. 88–98° C.

A solution of 5 g. of ethyl α-(2'-nitro-2-biphenoxy)-phenylacetate in ethanol is hydrogenated over Raney nickel catalyst to yield the corresponding 2'-amino compound which is refluxed in aqueous ethanolic sodium hydroxide solution for three hours. Cooling precipitates the product as the sodium salt which is dissolved in excess aqueous triethylamine. Addition of acetic acid (pH 5) liberates the free α-(2'-amino-2-biphenoxy)-phenylacetic acid. This acid is dissolved in a minimum of ethanol and treated with excess ethereal hydrogen chloride to yield the hydrochloride salt. The hydrochloride (2 g.) is dried azeotropically with toluene, then suspended in 75 ml. of nitrobenzene and refluxed for 40 minutes. The reaction mixture is cooled and the solvent distilled in vacuo to give 6 - phenyl-6H-dibenzo[e,g][1,4]oxazocinone-7(8H), M.P. 254–255° C.

Similarly by employing 6.8 g. of ethyl α-bromo-n-butyrate or 9.5 g. of ethyl α-bromo-4-methoxyphenylacetate instead of the ethyl α-bromophenylacetate in the above reaction sequence there is obtained 6-ethyl-6H-dibenzo-[e,g][1,4]-oxazocinone-7(8H), M.P. 142–143° C. or 6 - (4 - methoxyphenyl) - 6H - dibenzo[e,g][1,4]oxazocinone-7(8H).

EXAMPLE 7

To a solution of 5.3 g. of 11-chloro-6H-dibenzo[e,g][1,4]oxazocinone-7(8H) (prepared as in Example 4) in 50 ml. of dimethylsulfoxide is added 0.97 g. of sodium hydride and the resulting mixture is stirred under nitrogen for 15 minutes. A solution of 3.45 g. of cyclopropylmethyl bromide in 30 ml. of dimethylsulfoxide is added and after 15 minutes at room temperature the mixture is heated briefly to 80° C. When cooled, an additional quantity of sodium hydride (0.25 g.) and 1.4 g. of cyclopropylmethyl bromide are added and the temperature again raised to 80° C. Water is added to the cooled reaction mixture and extracted with ether. The extract is concentrated to yield 11-chloro-8-cyclopropylmethyl-6H-dibenzo[e,g][1,4]oxazocinone-7(8H).

EXAMPLE 8

A mixture of 2.6 g. of 11-chloro-6H-dibenzo[e,g][1,4]oxazocinone-7(8H) (prepared as in Example 4) and 0.78 g. of acetyl chloride in 25 ml. of pyridine is warmed on the steam bath for one hour. The reaction mixture is poured into dilute sodium hydroxide solution and extracted with methylene chloride. The organic extract is washed with water, dried and evaporated in vacuo to give 11 - chloro - 8 - acetyl - 6H - dibenzo[e,g][1,4]oxazocinone-7(8H).

Similarly reaction with 1.05 g. of cyclopropanecarbonyl chloride yields 11-chloro-8-cyclopropanecarbonyl-6H-dibenzo[e,g][1,4]oxazocinone-7(8H).

EXAMPLE 9

To a mixture of 10.8 g. of 2-hydroxy-2'-nitrobiphenyl (prepared as in Example 1) and one equivalent of sodium hydride in 75 ml. of dimethylformamide is added 9.2 g. of dimethylthiocarbamoyl chloride. The resulting mixture is stirred for three hours at 15–20° C., treated with 150 ml. of water and extracted with benzene. Removal of the benzene gives O-(2'-nitro-2-biphenylyl)-dimethylthiocarbamate which is heated alone for about 25 minutes at 100–200° C. to give the rearranged S-(2'-nitro-2-biphenylyl)-dimethylthiocarbamate.

A solution of the S-(2'-nitro-2-biphenylyl)-dimethylthiocarbamate in methanol containing an excess of 10% aqueous sodium hydroxide solution is heated under nitrogen for 12 hours. Following acidification and extraction with benzene there is obtained 2-mercapto-2'-nitrobiphenyl.

A mixture of 6.5 g. of 2-mercapto-2'-nitrobiphenyl and 0.74 g. of sodium hydride in 25 ml. of dimethylformamide is stirred under nitrogen at room temperature. After 15 minutes the mixture is treated with 5.14 g. of ethyl bromoacetate and the temperature is raised to 70° C. for one hour. The reaction mixture is cooled, treated with 200 ml. of water and extracted with methylene chloride. The dried extract is evaporated to give ethyl 2-(2'-nitro)-biphenylylthioacetate which is hydrogenated in the presence of Raney nickel in ethanol solution under pressure to yield the corresponding amino derivative. The latter is heated on the steam bath in methanolic potassium hydroxide to give 2-(2'-amino)-biphenylylthioacetic acid.

A slurry of 1.0 g. of 2-(2'-amino)-biphenylylthioacetic acid in 50 ml. of nitrobenzene is heated at reflux for 15 minutes. The solvent is removed in vacuo to give 6H-dibenzo[e,g][1,4]thiazocinone-7(8H).

Reduction of the thiazocinone with lithium aluminum hydride in tetrahydrofuran yields 6H-dibenzo[e,g][1,4]thiazocine-(7H,8H).

EXAMPLE 10

Employing the general procedures of Examples 1 and 4, equivalent amounts of the following 2-nitrobenzoic acids are reacted with 2-iodoanisole to give 2-methoxy-2'-nitrobiphenyl derivatives which are converted similarly to the corresponding dibenzo[e,g][1,4]oxazocinone products:

(A) Acid: 3-chloro-2-nitrobenzoic acid. Product: 9-chloro-6H-dibenzo[e,g][1,4]oxazocinone-7(8H).
(B) Acid: 4-chloro-2-nitrobenzoic acid. Product: 10-chloro-6H-dibenzo[e,g][1,4]oxazocinone-7(8H).
(C) Acid: 6-chloro-2-nitrobenzoic acid. Product: 12-chloro-6H-dibenzo[e,g][1,4]oxazocinone-7(8H).
(D) Acid: 3-methoxy-2-nitrobenzoic acid. Product: 9-methoxy-6H-dibenzo[e,g][1,4]oxazocinone-7(8H).
(E) Acid: 4-methoxy-2-nitrobenzoic acid. Product: 10-methoxy-6H-dibenzo[e,g][1,4]oxazocinone-7(8H).
(F) Acid: 5-methoxy-2-nitrobenzoic acid. Product: 11-methoxy-6H-dibenzo[e,g][1,4]oxazocinone-7(8H).
(G) Acid: 6-methoxy-2-nitrobenzoic acid. Product: 12-methoxy-6H-dibenzo[e,g][1,4]oxazocinone-7(8H).
(H) Acid: 3-methyl-2-nitrobenzoic acid. Product: 9-methyl-6H-dibenzo[e,g][1,4]oxazocinone-7(8H).
(I) Acid: 4-methyl-2-nitrobenzoic acid. Product: 10-methyl-6H-dibenzo[e,g][1,4]oxazocinone-7(8H).
(J) Acid: 5-methyl-2-nitrobenzoic acid. Product: 11-methyl-6H-dibenzo[e,g][1,4]oxazocinone-7(8H).
(K) Acid: 6-methyl-2-nitrobenzoic acid. Product: 12-methyl-6H-dibenzo[e,g][1,4]oxazocinone-7(8H).
(L) Acid: 4-bromo-2-nitrobenzoic acid. Product: 10-bromo-6H-dibenzo[e,g][1,4]oxazocinone-7(8H).
(M) Acid: 4-trifluoromethyl-2-nitrobenzoic acid. Product: 10-trifluoromethyl - 6H - dibenzo[e,g][1,4]oxazocinone-7(8H).

What is claimed is:
1. A chemical compound or its salt with a pharmaceutically acceptable acid, said compound having the formula:

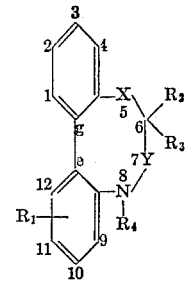

in which:
X is oxygen or sulfur;
Y is methylene (—CH$_2$—) or carbonyl (>C=O);
R$_1$ is hydrogen, chlorine, bromine, lower alkyl, lower alkoxy or trifluoromethyl;
R$_2$ is hydrogen or lower alkyl;
R$_3$ is hydrogen, lower alkyl, phenyl, phenyl substituted by methyl, methoxy or chloro; or benzyl; and
R$_4$ is hydrogen, lower alkyl, lower alkenyl, lower-alkanoyl, cycloalkyl-lower alkyl, cycloalkylcarbonyl or dilower-alkylaminoloweralkyl;
each of said lower alkyl and lower alkoxy moieties having from 1 to 4 carbon atoms, said lower alkanoyl moiety having from 2 to 4 carbon atoms, and said lower alkenyl and cycloalkyl moieties having from 3 to 6 carbon atoms.

2. A chemical compound according to claim 1 in which X is oxygen; Y is carbonyl; R$_1$ is hydrogen, chlorine or trifluoromethyl; R$_2$ and R$_3$ are hydrogen; and R$_4$ is hydrogen, methyl, allyl, acetyl, cyclopropylcarbonyl, cyclopropylmethyl or dimethylaminopropyl.

3. A chemical compound according to claim 2 in which R$_1$ is hydrogen.

4. A chemical compound according to claim 2 in which R$_1$ is chlorine.

5. A chemical compound according to claim 2 in which R$_1$ is trifluoromethyl.

6. A process for the preparation of chemical compounds according to claim 1 in which Y is carbonyl and R$_4$ is hydrogen which comprises ring closing a 2'-amino-2-biphenylyl acid having the formula:

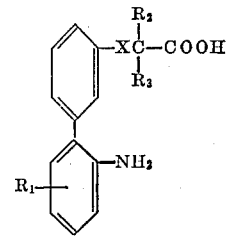

either as the free base or an acid addition salt thereof, by heating at a temperature of from 175–250° C.

References Cited

UNITED STATES PATENTS 3,079,393 2/1963 Yale et al.
3,079,400 3/1963 Yale et al.

HENRY R. JILES, Primary Examiner

R. T. BOND, Assistant Examiner

U.S. Cl. X.R.

260—327, 333; 424—244

UNITED STATES PATENT OFFICE
CERTIFICATE OF CORRECTION

Patent No. 3,407,154                        October 22, 1968

George Sims Casebolt et al.

It is certified that error appears in the above identified patent and that said Letters Patent are hereby corrected as shown below:

Column 5, lines 13 to 15, the formula should appear as shown below:

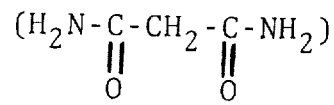

Column 6, line 61, after "anhydride," insert -- 7.8 parts of hexamethylenetetramine, --; line 62, "nium" should read -- 10.5 parts of titanium --.

Signed and sealed this 3rd day of March 1970.

(SEAL)
Attest:

EDWARD M. FLETCHER, JR.
Attesting Officer

WILLIAM E. SCHUYLER, JR.
Commissioner of Patents